(12) United States Patent
McComb et al.

(10) Patent No.: US 8,641,535 B2
(45) Date of Patent: Feb. 4, 2014

(54) GAMING MACHINE CABINET CONSTRUCTION AND METHOD

(75) Inventors: Ryan D. McComb, Grand Rapids, MI (US); Orlando W. Stephenson, III, Kentwood, MI (US)

(73) Assignee: Patent Rights Protection Group, LLC, Las Vegas, NV (US)

( * ) Notice: Subject to any disclaimer, the term of this patent is extended or adjusted under 35 U.S.C. 154(b) by 1091 days.

(21) Appl. No.: 12/630,226

(22) Filed: Dec. 3, 2009

(65) Prior Publication Data

US 2011/0136573 A1    Jun. 9, 2011

(51) Int. Cl.
*A63F 9/24* (2006.01)
*A63F 13/00* (2006.01)
*G06F 17/00* (2006.01)
*G06F 19/00* (2011.01)

(52) U.S. Cl.
USPC .......................................................... 463/46

(58) Field of Classification Search
USPC .................................................. 463/16, 46
See application file for complete search history.

(56) References Cited

U.S. PATENT DOCUMENTS

| | | |
|---|---|---|
| D275,117 S | 8/1984 | Heywood |
| D307,771 S | 5/1990 | Cesaroni et al. |
| 5,108,099 A | 4/1992 | Smyth |
| 5,113,990 A | 5/1992 | Gabrius et al. |
| D333,164 S | 2/1993 | Kraft et al. |
| 5,515,959 A | 5/1996 | Stephenson, III et al. |
| 5,544,595 A | 8/1996 | Stephenson, III et al. |
| D373,809 S | 9/1996 | Hirato |
| D380,014 S | 6/1997 | Yang |
| D381,697 S | 7/1997 | Brettschneider |
| D381,700 S | 7/1997 | Brettschneider |
| 5,826,882 A | 10/1998 | Ward |
| D413,635 S | 9/1999 | Taylor |
| 6,068,101 A | 5/2000 | Dickenson et al. |
| D428,062 S | 7/2000 | Hayashi |
| 6,135,884 A | 10/2000 | Hedrick et al. |
| D439,931 S | 4/2001 | Yamaguchi |
| D446,252 S | 8/2001 | Yamaguchi |
| 6,334,612 B1 | 1/2002 | Wurz et al. |
| D489,417 S | 5/2004 | Munoz et al. |
| D495,754 S | 9/2004 | Wurz et al. |
| D495,755 S | 9/2004 | Wurz et al. |
| D498,267 S | 11/2004 | Crouch |
| 6,860,814 B2 | 3/2005 | Cole |
| D508,268 S | 8/2005 | Hanchar et al. |
| D508,961 S | 8/2005 | Gatto et al. |

(Continued)

OTHER PUBLICATIONS

Bluebird Slant Widescreen literature from www.wms.com/technologyandinnovation_cabinets_widescreen.php dated May 19, 2009, showing a gaming machine cabinet that was sold and/or publicly disclosed at least as early as Dec. 13, 2008.

(Continued)

*Primary Examiner* — Omkar Deodhar
*Assistant Examiner* — Reginald Renwick
(74) *Attorney, Agent, or Firm* — Dickinson Wright PLLC

(57) ABSTRACT

A gaming machine includes a plurality of rails extending vertically along the front corners of the cabinet. The number of rails can be varied as required for gaming machines of different heights. Lighting units may be positioned between vertically adjacent rails. The number of rails utilized to form a gaming machine can be varied as required for gaming machines of different heights.

16 Claims, 12 Drawing Sheets

(56) References Cited

U.S. PATENT DOCUMENTS

| | | |
|---|---|---|
| D513,044 S | 12/2005 | Morrison |
| D525,664 S | 7/2006 | Cole |
| D535,338 S | 1/2007 | Linard et al. |
| D563,481 S | 3/2008 | Looks et al. |
| D564,601 S | 3/2008 | Strahinic et al. |
| 7,339,782 B1 | 3/2008 | Landes et al. |
| D566,197 S | 4/2008 | Greenberg et al. |
| D572,312 S | 7/2008 | Stephenson, III et al. |
| D573,200 S | 7/2008 | Hashimoto et al. |
| D578,168 S | 10/2008 | Looks et al. |
| D586,866 S | 2/2009 | Hsu |
| 7,513,830 B2 | 4/2009 | Hajder et al. |
| D592,709 S | 5/2009 | McComb et al. |
| D619,660 S | 7/2010 | Cole et al. |
| D622,781 S * | 8/2010 | Lesley et al. ................. D21/369 |
| D626,183 S | 10/2010 | Cole et al. |
| D633,950 S | 3/2011 | Terpstra et al. |
| D649,605 S | 11/2011 | Terpstra et al. |
| 2003/0109304 A1* | 6/2003 | Gauselmann ................... 463/30 |
| 2004/0001335 A1 | 1/2004 | Wu |
| 2004/0053699 A1 | 3/2004 | Rasmussen et al. |
| 2004/0224776 A1 | 11/2004 | Nagano |
| 2005/0130746 A1 | 6/2005 | Stephenson, III et al. |
| 2006/0030412 A1 | 2/2006 | Cole |
| 2006/0073900 A1 | 4/2006 | Cole et al. |
| 2006/0094511 A1 | 5/2006 | Roireau |
| 2006/0199647 A1 | 9/2006 | Anderson |
| 2007/0035965 A1 | 2/2007 | Holst |
| 2007/0054742 A1 | 3/2007 | McComb et al. |
| 2007/0149291 A1 | 6/2007 | Mitchell |
| 2007/0159820 A1 | 7/2007 | Crandell et al. |
| 2007/0171640 A1 | 7/2007 | Sloan et al. |
| 2007/0197301 A1 | 8/2007 | Cole |
| 2007/0225079 A1 | 9/2007 | Cole |
| 2007/0287527 A1 | 12/2007 | Tanabe et al. |
| 2007/0287528 A1 | 12/2007 | Hirato et al. |
| 2007/0287544 A1* | 12/2007 | Hirato et al. ................... 463/46 |
| 2008/0045347 A1 | 2/2008 | Stephenson et al. |
| 2008/0113794 A1 | 5/2008 | Cole |
| 2008/0182642 A1 | 7/2008 | Cole |
| 2008/0227554 A1 | 9/2008 | Cole et al. |
| 2009/0011839 A1 | 1/2009 | Cole et al. |
| 2009/0275389 A1 | 11/2009 | Englman et al. |
| 2010/0016084 A1 | 1/2010 | Bleich et al. |

OTHER PUBLICATIONS

Spec International, Inc., GEN-311 gaming machine cabinet, publicly disclosed at least as early as Dec. 13, 2008.

* cited by examiner

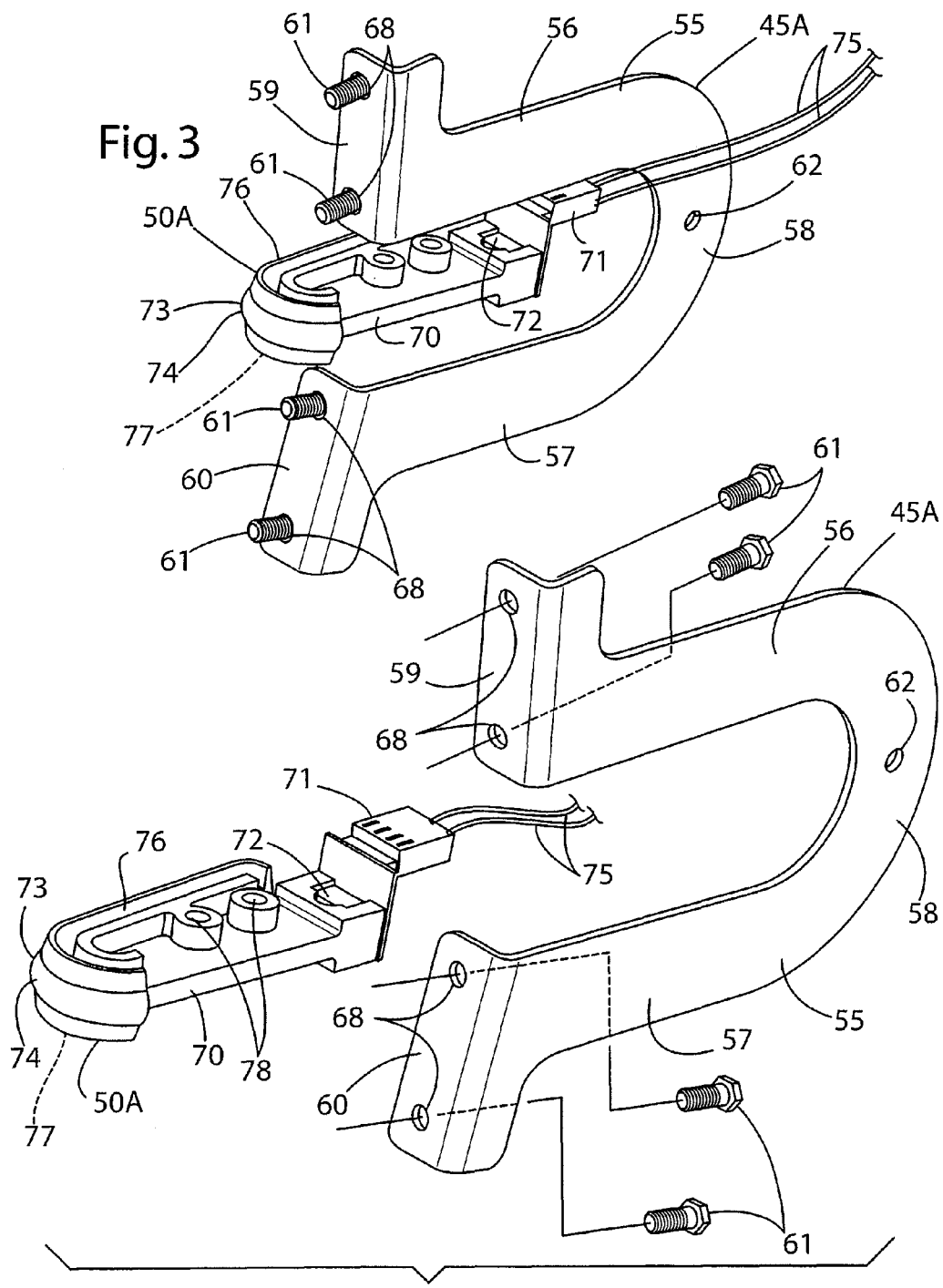

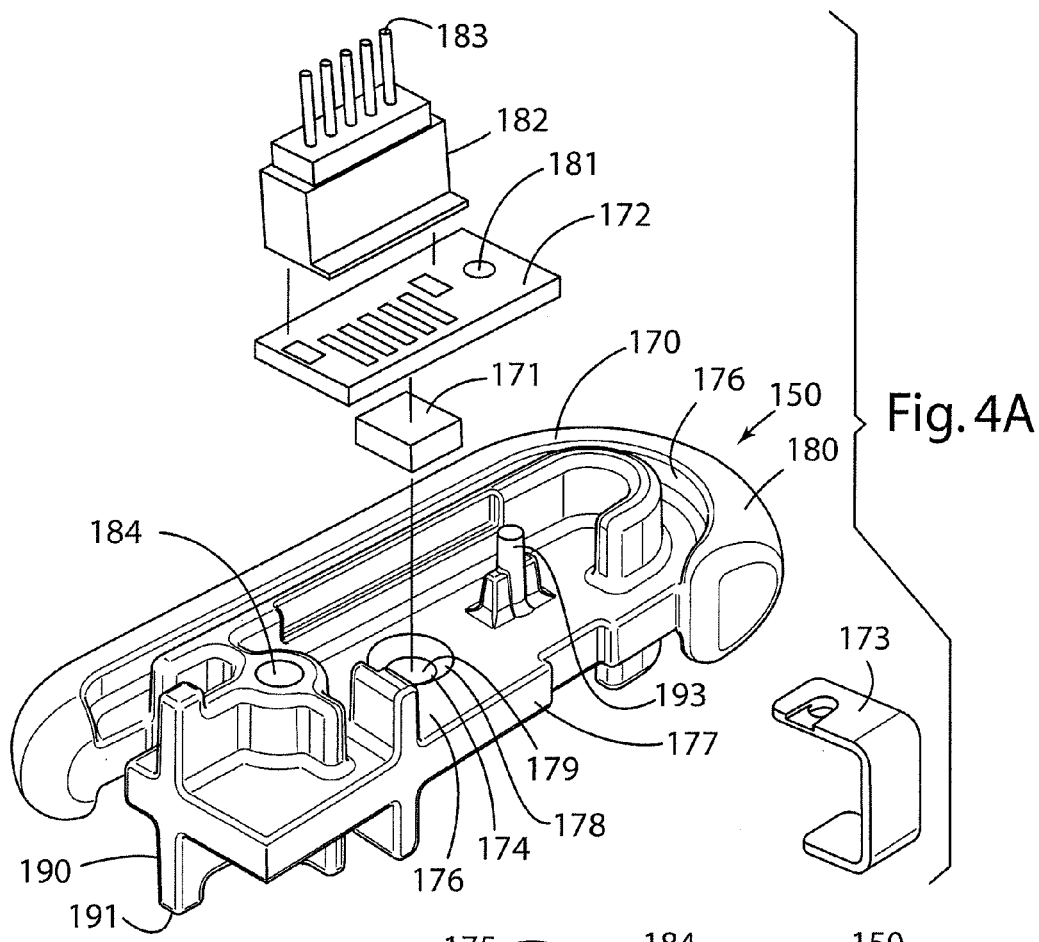
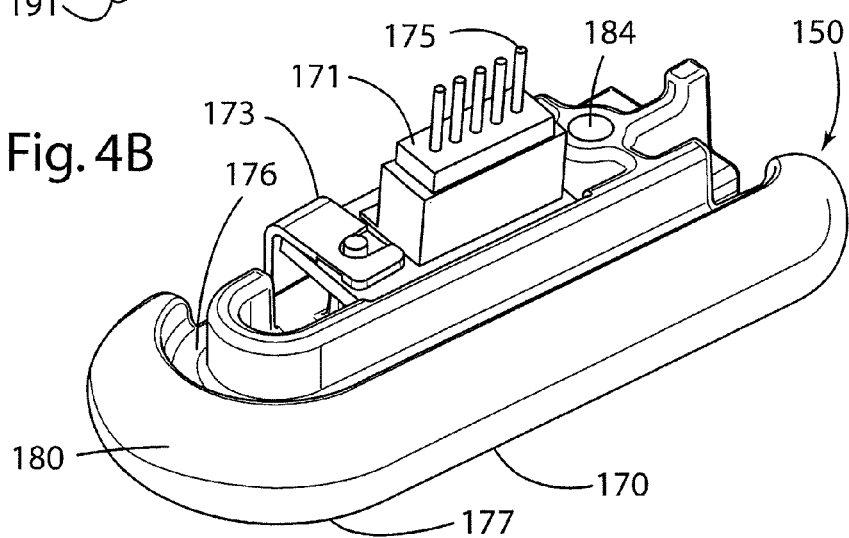

GAMING MACHINE CABINET CONSTRUCTION AND METHOD

BACKGROUND OF THE INVENTION

Various types of gaming machines have been developed. Some gaming machines are utilized for amusement/entertainment purposes only, whereas other gaming machines include features whereby the user can wager money. Wager-type gaming machines are commonly used in casinos and the like. These gaming machines may include one or more video display screens that are operably connected to a controller, and they may also include mechanical reels or other user interface/display features.

Existing gaming machines may include a cabinet housing various internal gaming components. The cabinets also provide for mounting of video displays, user input features such as push buttons or the like. Gaming machine cabinets may have various heights, widths, and other features as required for a particular game. For example, some gaming machines are configured for use by a standing user, whereas other gaming machines are configured to be utilized by a user who is sitting. Stand up type gaming machines often have an overall height that is substantially greater than that of sit down type gaming machines. Also, stand up type machines may include a plurality of video displays or the like, whereas a sit down unit may include a single video display. Both stand up and sit down gaming machines may have a variety of configurations including multiple video display screens or other features as required for a particular game/application. Gaming machine cabinets having various sizes and shapes may be utilized to provide for the different requirements of different games. Thus, cabinets for stand up type gaming machines may have different heights, and sit down type machines may also have different heights.

Gaming machine cabinets have been fabricated in a variety of different sizes and configurations to accommodate the requirements for different games. Various parts such as panels, trim, doors, and the like may be fabricated for each cabinet design. However, such parts may be specifically sized/configured for a specific cabinet type/size, such that different components must be made for each size/type of cabinet.

SUMMARY OF THE INVENTION

One aspect of the present invention is a gaming machine including a cabinet structure having front and rear sides, and generally upright opposite side faces extending between the front and rear sides. The opposite side faces intersect the front side to define first and second horizontally spaced-apart forward corner portions that extend vertically. The gaming machine includes at least one display screen disposed on the front side of the cabinet structure, and at least one controller operably connected to the display screen. The controller is configured to cause the display screen to display game images. At least one user input feature is operably connected to the controller to provide for user interaction with the gaming machine. The gaming machine further includes at least two generally upright elongated side rails connected to the cabinet structure and extending along the first corner portion, and at least two generally upright elongated side rails connected to the cabinet structure and extending along the second forward corner portion. Each elongated side rail defines a length and an outer surface, and the lengths and outer surfaces of each of the elongated side rails extending along the first forward corner portion are substantially identical to one another. The lengths and outer surfaces of each of the elongated side rails extending along the second forward corner portion are also substantially identical to one another.

Another aspect of the present invention is a gaming machine cabinet including a cabinet structure defining front and rear sides, and opposite sides extending between the front and rear sides to define at least two vertically extending corner portions. The gaming machine cabinet includes a plurality of elongated rails extending along at least one of the corner portions in an end-to-end manner, wherein the elongated rails are substantially identical to one another in appearance.

Yet another aspect of the present invention is a method of fabricating a plurality of gaming machine cabinets. The method includes forming a least a first gaming machine cabinet having a first height, and forming at least a second gaming machine cabinet having a second height that is substantially greater than the first height. The method also includes forming a plurality of elongated rail members having opposite ends, wherein the rail members have substantially the same lengths. The method also includes securing a first number of elongated rails to the first gaming machine cabinet with the elongated rails disposed in and end-to-end manner. The method further includes securing a second number of elongated rails to the second gaming machine cabinet with the elongated rails disposed in an end-to-end manner, wherein the second number of elongated rails is greater than the first number of elongated rails.

BRIEF DESCRIPTION OF THE DRAWINGS

FIG. 3 is an isometric view of a bracket and light unit of the gaming machine of FIG. 2;

FIG. 4 is an exploded isometric view of the bracket and light unit of FIG. 3;

FIG. 4A is an exploded isometric view of a light unit according to another aspect of the present invention;

FIG. 4B is an isometric view of the light unit of FIG. 4A taken from a different angle;

FIG. 2;

DETAILED DESCRIPTION OF PREFERRED EMBODIMENT

Figure 1:
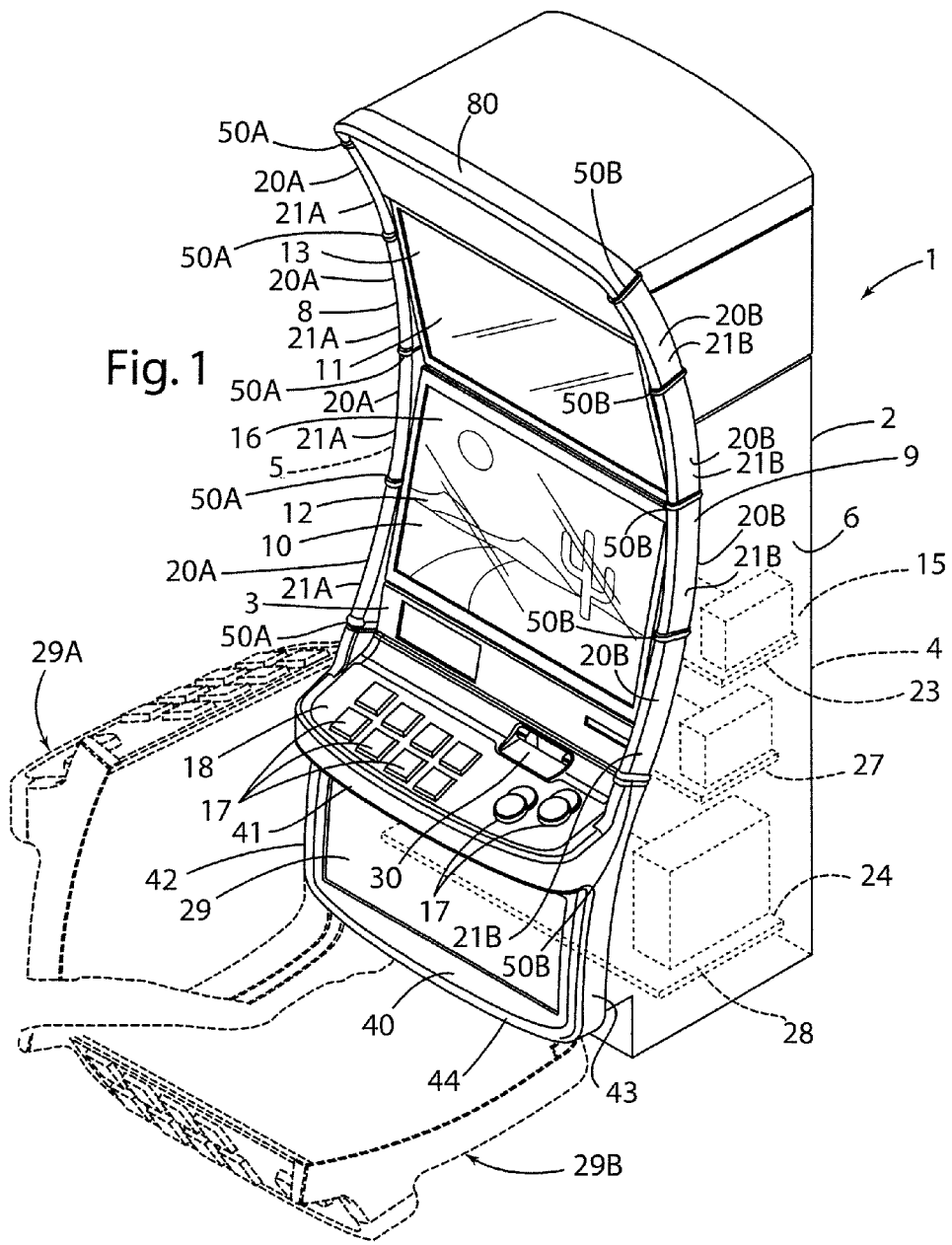
FIG. 1 is a partially fragmentary isometric view of a gaming machine according to one aspect of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, a gaming machine 1 according to one aspect of the present invention includes a cabinet structure 2 including a front side 3, and a rear side 4, and opposite side faces 5 and 6 extending between the front and rear sides 3 and 4, respectively, and intersecting the front side 3 to define first and second horizontally spaced-apart, vertically-extending forward corner portions 8 and 9, respectively. At least a first display screen 10 is disposed on the front side 3 of the cabinet structure 2. In the example illustrated in FIG. 1, display screen 10 comprises a first video display screen that is mounted to the cabinet structure 2 with planar surface 12 facing forwardly and upwardly. A second display screen 11 is mounted above first display screen 10, and includes a planar surface 13 that faces forwardly and downwardly. At least one controller 15 is operably connected to the display screen 10, and causes the display screen 10 to display game images 16. One or more user input features such as push buttons 17 may be mounted to a forwardly-projecting portion 18 of a lower door 29 that is movably mounted to cabinet structure 2. The buttons 17 provide for user interaction with the gaming machine. In addition to the user input features or buttons 17, a bill collector 30 may also be provided. Bill collector 30 may also include a credit card-reading feature if required for a particular application. The buttons 17 or other user input features may have a variety of configurations as required for a particular application.

The gaming machine 1 also includes a plurality of generally upright elongated side rails 20A that are connected to the cabinet structure 2, and extend along the first corner portion 8. A plurality of generally upright elongated side rails 20B are connected to the cabinet structure 2, and extend along the second forward corner portion 9. Elongated side rails 20A and 20B define lengths "LA" and "LB", respectively (see also FIG. 2), and outer surfaces 21A and 21B, respectively. The lengths LA and outer surfaces 21A of the elongated side rails 20A extending along the first forward corner portion 8 are substantially identical to one another, and the lengths LB and outer surfaces 21B of the elongated side rails 20B extending along the second forward corner portion 9 are substantially identical to one another. In the illustrated example, the rails 20A and 20B are mirror images of one another. However, the rails 20A could be identical to the rails 20B. In general, the length LA of rails 20A is substantially the same as the length LB of rails of 20B. However, the lengths LA and LB could be different according to other aspects of the present invention.

Referring again to FIG. 1, controller 15 may be mounted to a shelf 23 disposed within interior space 24 of cabinet structure 2. Additional components 25 and 26 may be mounted to shelves 27 and 28. In general, components 25 and 26 may comprise coin/bill collectors or other known components utilized for gaming machines. The shelves 23, 27, and 28 may have a variety of sizes and configurations as required for a particular application, and need not be limited to the configurations shown in the illustrated examples. A lower door 29 may be movably mounted to the front side 3 of cabinet structure 2 to provide access to the controller 15 and components 25 and 26. Also, display screens 10 and 11 may be movably mounted (e.g. pivotably or slidably) to cabinet structure 2 to provide for access to the interior space 24. Alternately, the display screens 10 and 11 may be removably mounted to the cabinet structure 2 to provide for additional access to the interior space 24.

Figure 2:
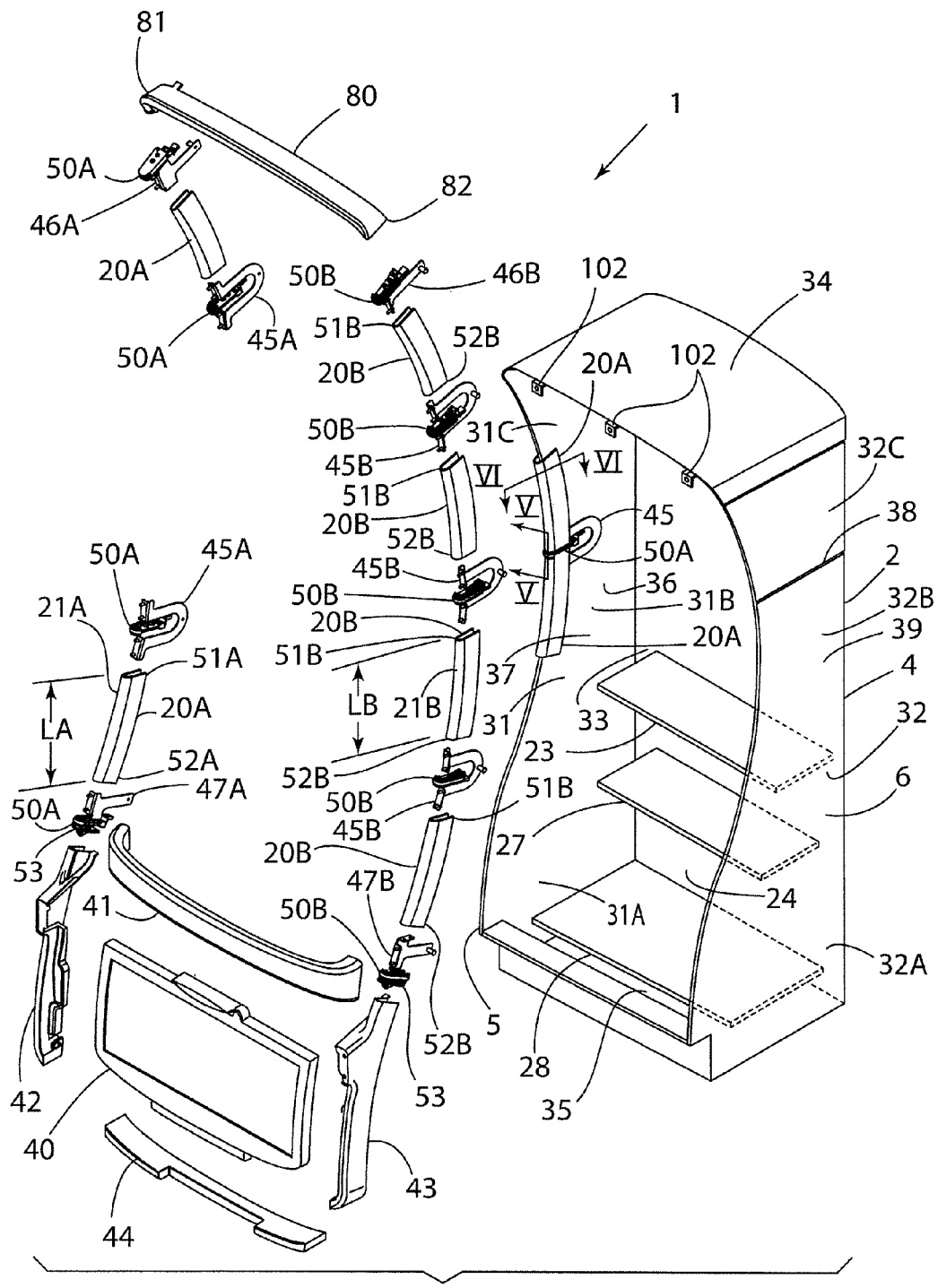
FIG. 2 is an exploded isometric view of the gaming machine of FIG. 1.

With further reference to FIG. 2, cabinet structure 2 may comprise side panels 31 and 32 forming opposite side faces 5 and 6, respectively, and a rear panel 33 forming rear side 4. Cabinet structure 2 may also include an upper panel 34 and a lower panel 35. The panels 31-35 may comprise sheet metal, wood, or other suitable material. In the illustrated example, panels 31-35 comprise steel sheet metal material. Side panel 31 may be one-piece members or they may be assembled from individual panel segments 31A, 31B, and 31C, respectively, that are joined at seams or junctions 36 and 37. Similarly, side panel 32 may be one-piece or it may be formed from individual panel segments 32A, 32B, and 32C that form seams or junctions 38, 39. As discussed in more detail below, a gaming machine 1A having an intermediate height (FIG. 8) may be fabricated utilizing side panels 31A, 31B, 32A, and 32B (i.e. omitting side panels 31C and 32C). Similarly, a lower height gaming machine 1B (FIG. 9) may be fabricated utilizing side panels 31A and 32A.

Referring again to FIGS. 1 and 2, lower door 29 may be mounted to cabinet structure 2 via conventional hinges or the like (not shown) for rotation about a generally vertical axis. When mounted in this manner, lower door 29 pivots outwardly to an open position 29A. Alternately, lower door 29 may be pivotably mounted to cabinet structure 2 for rotation about a horizontal axis from a closed position to an open position 29B. Door 29 includes a forwardly-projecting shelf-like portion 18 that provides for mounting of user input features such as push buttons 17 that are operably connected to controller 15 and/or other components 25, 26, etc. Trim pieces 41, 42, 43 and 44 and rectangular door member 40 are mounted to lower door 29. As discussed in more detail below, the trim pieces 41-44 may also be utilized in the gaming machines 1A and 1B shown in FIGS. 8 and 9, respectively. Gaming machines 1, 1A, and 1B may utilize a lower door 29, trim pieces 41-44, and user input features such as buttons 17, bill collector 30, and the like that are identical to those of gaming machine 1 (FIG. 1). Alternately, gaming machines 1A (FIG. 8) and 1B (FIG. 9) may have different user input features 17, bill collector 30, and trim pieces 41-44 if required for a particular application.

Referring again to FIG. 2, left rails 20A are secured to cabinet structure 2 utilizing one or more U-shaped intermediate brackets 45A, upper brackets 46A, and lower brackets 47A. Similarly, right rails 20B are connected to cabinet structure 2 utilizing one or more U-shaped intermediate brackets 45B, upper brackets 46B, and lower brackets 4713. U-shaped brackets 45A and 45B may be identical to one another, or they may be mirror images of one another. Similarly, upper brackets 46A and 46B may be identical to one another, or they may be mirror images of one another. Also, lower brackets 47A and 4713 may be identical to one another, or they may be mirror images of one another. In the illustrated example, the brackets utilized on the left and right sides of gaming machine 1 are identical to one another. As discussed in more detail below, the brackets 45, 46, and 47 can be oriented as required for use as left brackets 45A, 46A, 47A, or as right brackets 45B, 46B, and 47B. Because the left and right brackets are identical (other than orientation), only the "left" brackets 45A, 46A, and 47A are described in detail. As also described in more detail below, a plurality of spacers such as left light units 50A may be mounted between ends 51A and 52A of adjacent rails 20A, and spacers such as right light units 50B may be mounted between adjacent ends 51B and 52B of rails 20B. Light units 50A and 50B are preferably identical to one another except that the light units 50A and 50B are rotated 180° relative to one another. It will be understood that the subscripts A and B are utilized herein in connection with trim members 20, brackets 45, 46, 47, and light units 50 to designate use in left and right side locations with a corresponding change in orientation of these components if required.

Figure 4C:
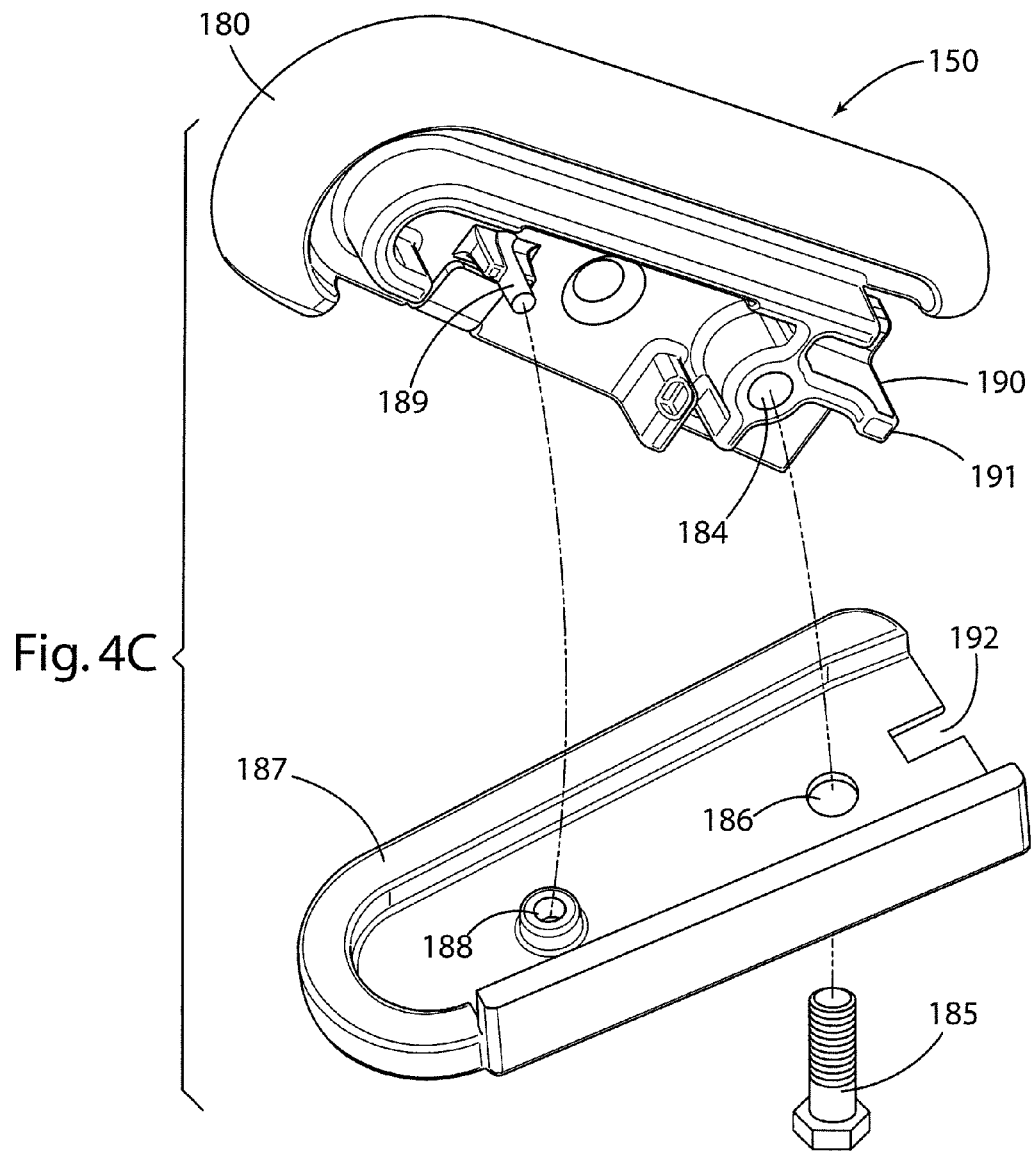
FIG. 4C is an isometric view of the light unit of FIG. 4A, including a cover.
Figure 5:
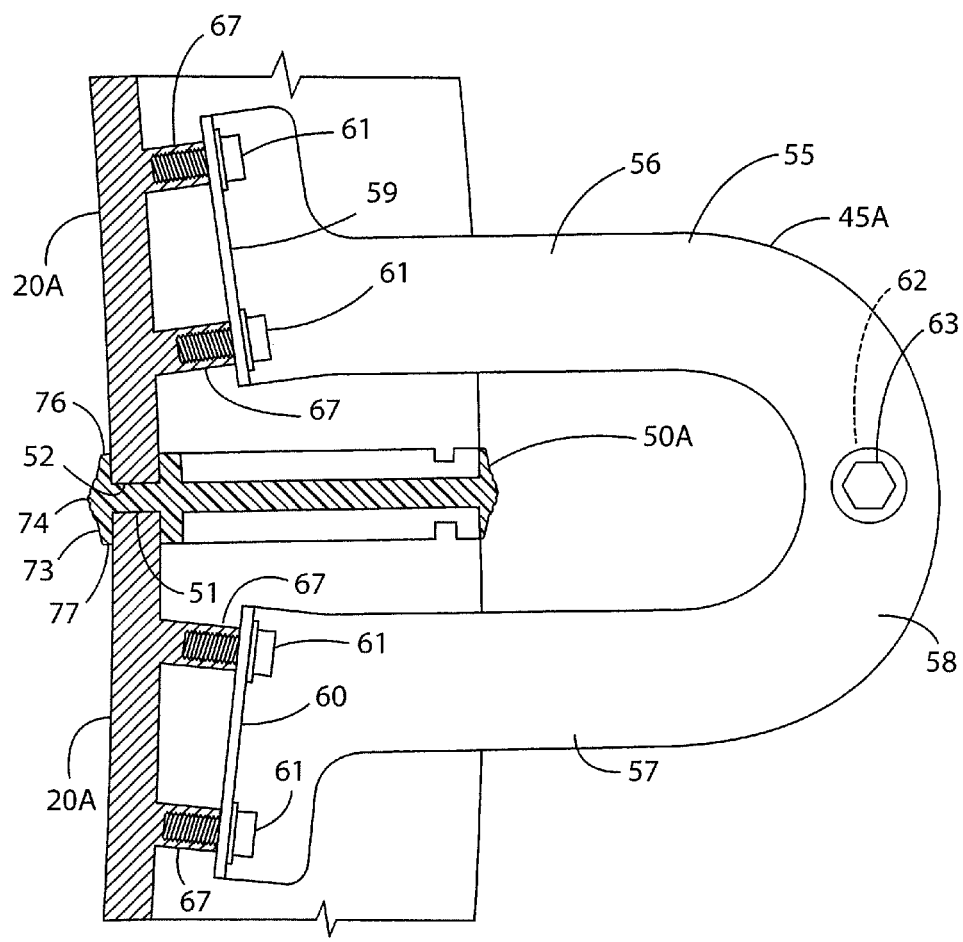
FIG. 5 is a section view taken along the line V-V.
Figure 6:
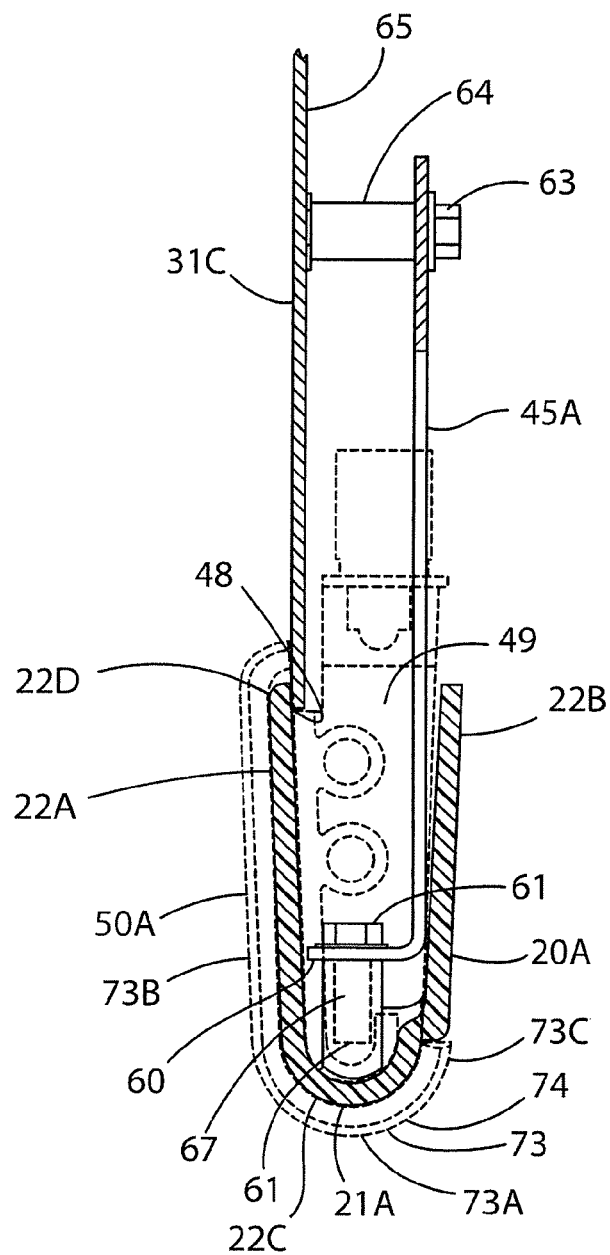
FIG. 6 is a cross-sectional view taken along the line VI-VI of FIG. 2.

With further reference to FIGS. 3 and 4, a U-shaped bracket 45A includes a U-shaped body portion 55 with leg portions 56 and 57 that extend from a base portion 58. Flanges 59 and 60 extend transversely from leg portions 56 and 57, and a pair of openings 68 in flanges 59 and 60 receives threaded fasteners 61. Threaded fasteners 61 connect to threaded bosses 67 of side rails 20A to thereby interconnect a pair of adjacent rails 20A with a light unit 50A disposed between a pair of rails 20A. An opening 62 through base portion 58 of U-bracket 45A receives a threaded fastener 63 (see also FIGS. 5 and 6) that is threadably received in a threaded boss 64 that extends inwardly from inner side surface 65 of side panel 31 to thereby connect bracket 45A to side panels 31. With further reference to FIG. 6, rails 20A have a U-shaped cross sectional shape with an outer leg 22A and an inner leg 22B that are joined by a curved base portion 22C to define a gap or space 49. Forward edge portion 48 of side panel 31C extends into space 49, and end 22D of outer leg 22A extends over forward edge portion 48 of side panel 31C.

Referring again to FIGS. 3 and 4, light modules 50A include a body portion 70 that may be molded of a clear or colored light-transmitting polymer material. A light source 71 is secured to the body portion 70, and a bulb 72 of light source 71 generates light that is transmitted through the body portion 70. One or more power supply lines such as wires 75 may be utilized to provide electrical power to the light sources 71. At least some of the light from light source 71 eventually escapes from outer surface 73 of body portion 70, and thereby provides a decorative affect. Outer surface 73 may include a convex raised portion 74 that protrudes outwardly beyond the outer surface 21A of rails 20 (see also FIG. 6). The units 50A and 50B may comprise non-lighted spacers. If the units 50A and 50B do not include a light source 71, the body portion 70 may be made of a non-light transmitting/opaque polymer material. When assembled, ends 51 and 52 (FIG. 5) of a pair of adjacent rails are received in grooves 77, and 76 respectively, of light unit 50. U-bracket 45A holds the adjacent rails 20A, 20B together, thereby retaining light unit 50A. Thus, the light units 50 can be interconnected with rails 20 without securing light units 50 to the rails 20 directly with threaded fasteners or the like. As discussed below, if a light unit 50 is positioned at an uppermost location adjacent horizontal member 80, or at a lowermost location adjacent trim pieces 42, 43 of door 29, threaded fasteners are received in openings 78 in body portion 70 of light units 50 to attach light unit 50 to a bracket 46 or 47. However, preferably as discussed above, openings 78 are not utilized to interconnect light units 50 with a pair of adjacent rails 20 that are interconnected with a U-bracket 45 as shown in FIG. 5.

With reference to FIGS. 4A and 4B, a light unit 150 according to another aspect of the present invention includes a body 170 that is molded from a polymer material. The polymer material of the body 170 is preferably translucent or light-transmitting. The body 170 may be clear, or it may have various colors such as yellow, red, green, or the like. The body 170 includes channels 176 and 177 that receive edge portions of rails 20 in substantially the same manner as the curved channels 76 and 77 described in more detail above in connection with the light unit of FIGS. 3 and 4.

An LED 171 is mounted on a mounting board 172 that is retained to the body 170 by a clip 173. The LED 171 may comprise a red, green, blue (RGB) LED. The LED 171 is mounted such that it emits light directly into a cavity 174 formed in an upper surface 176 of a flat, plate-like central web 177 of body 170. The cavity 174 includes tapered side surfaces 178 and a flat bottom 179, such that cavity 174 has the shape of a truncated cone. Light from LED 171 enters the central wed 178 of body 170 at cavity 174, and the light is transmitted outwardly from the cavity 174 to the outer surfaces 180 of the body 170. The outer surfaces 180 are smoothly curved, such that the outer surfaces 180 do not include a raised portion 74 of the light units 50A described in more detail above in connection with FIGS. 3 and 4. In a preferred embodiment, the outer surface 180 has a constant radius in cross section to form a half circle shape. An electrical connector 182 may be connected to the mounting board 172 to provide electrical power to the LED 171. A receptacle-type connector (not shown) may be connected to the pins 183 of connector 182 to thereby electrically connect the connector 182 to wires or the like. The LED 171, mounting board 172, and connector 182 may have a design that is substantially similar to existing arrangements, and these parts will not therefore be described in detail. An opening 184 through the body 170 is configured to receive a threaded fastener 185 that also extends through an opening 186 in a cover 187 to secure the cover 187 to the body 170 when the lighting unit 150 is used in an upper most or lower most location. Cover 187 also includes an opening 188 that receives a pin 189 formed in body 170 to align cover 187 with body 170. Also, a vertical web 190 of body 170 includes an extension 191 that is received in a notch 192 of cover 187 to align cover 187 with body 170 of light unit 150.

With reference to FIG. 6, outer surface 73 of body portion 70 of light unit 50A may include a forwardly-facing portion 73A, and a portion 73B that faces outwardly. A portion 73C of outer surface 73 may face inwardly. Body portion 70 of light unit 50A includes an upwardly-opening curved channel 76 having a contour closely corresponding to the shape of opposite ends 52A of rails 20A. A downwardly opening curved channel 77 in body portion 70 has substantially the same contour as channel 76 for receiving ends 51A of rails 20A.

Figure 7:
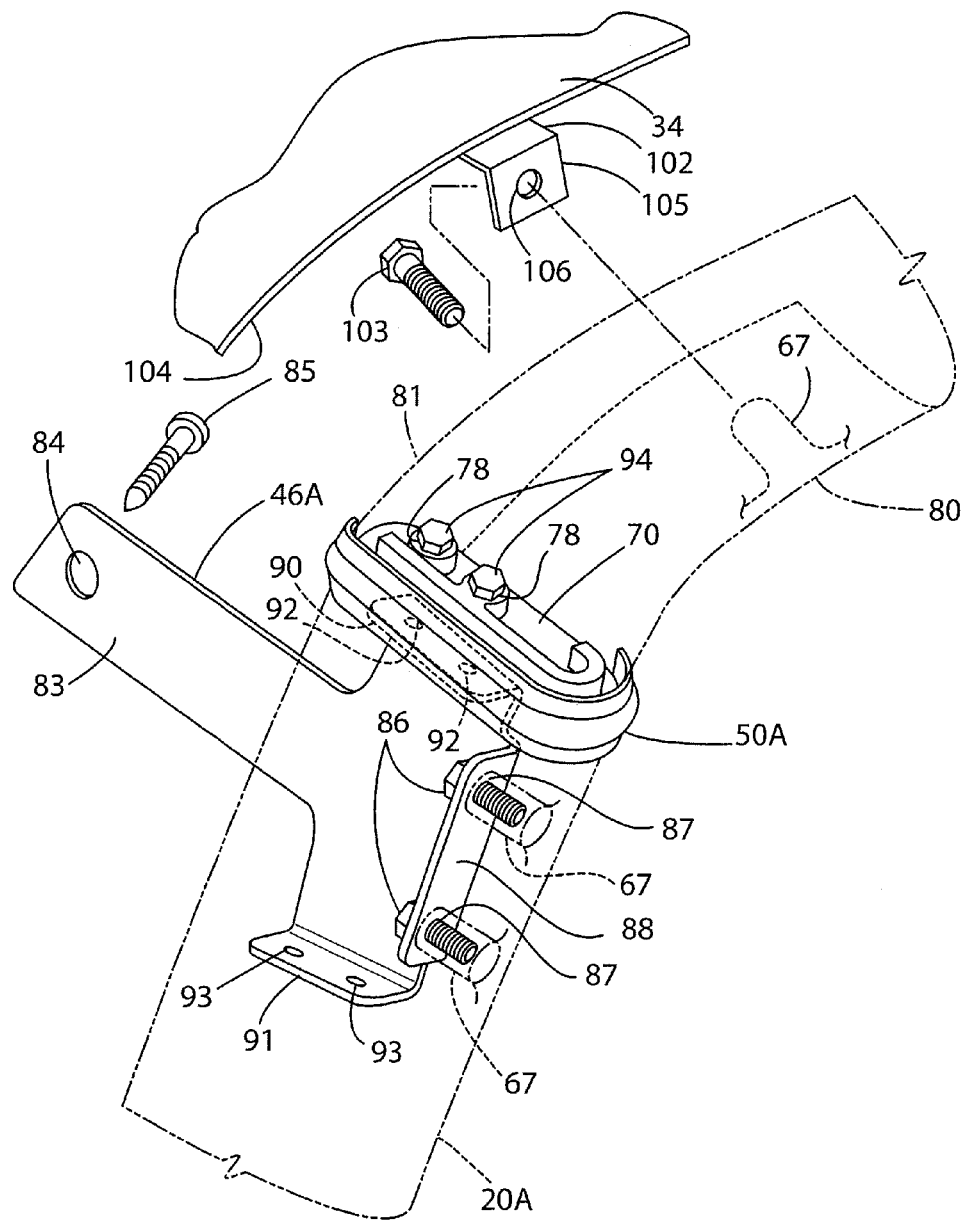
FIG. 7 is an isometric view of an upper bracket and light unit of the gaming of FIG. 2.

Referring again to FIG. 2, an upper horizontal member 80 includes opposite ends 81 and 82 that connect to upper brackets 46A and 46B, respectively, to interconnect horizontal member 80 with rails 20A and 20B. With further reference to FIG. 7, an upper bracket 46A is generally T-shaped, and includes an inner end portion 83 having an opening 84 that receives a threaded fastener 85 to secure the bracket 46A to a threaded boss 64 (see also FIG. 6) on a side panel 31 of cabinet 2 in substantially the same manner as U-brackets 45. Threaded fasteners 86 are received in openings 87 in flange 88 of bracket 46A. The threaded fasteners 86 engage threaded bosses 67 (see also FIG. 6) of rail 20A to thereby secure the rail 20A to bracket 46A. Bracket 46A includes upper and lower flanges 90 and 91, respectively, having clearance openings 92 and 93, respectively. Threaded fasteners 94 extend through openings 78 in body 70 of light unit 50A (see also FIG. 4), and through openings 93 to thereby secure light unit 50A to bracket 46A. The bracket 46A can be rotated 180 degrees relative to the orientation shown in FIG. 7 for use as a bracket 46B (FIG. 2). When bracket 46 is in a right hand configuration, flange 91 is utilized to interconnect the bracket 46B with a lighting unit 50B.

A plurality of brackets 102 (see also FIG. 2) are secured to upper panel 34 of cabinet 2. Brackets 102 include a flange 105 having an opening 106. When assembled, threaded fasteners 103 extend through openings 106 of brackets 105, and the threaded fasteners 103 are threadably received in threaded bosses 67 of upper horizontal member 80 to thereby connect upper horizontal member 80 to cabinet 2. Bosses 67 of upper horizontal member 80 may be substantially similar to the bosses 67 of the side rails 20 as shown in FIG. 6.

A lower bracket 47 may be utilized in a left hand configuration 47A and a right hand configuration 47B (FIG. 2). Bracket 47 is substantially similar to the bracket 46 (FIG. 5). Lower brackets 47A and 47B connect the lower light units 50A and 50B to the lower ends 52A and 52B of the lowermost rails 20A and 20B, respectively. A cap or cover 53 (FIG. 2) fits over the end of the lowermost light unit 50. Trim pieces 42 and 43 move with door 29 as it is opened, and lowermost light units 50A and 50B are therefore exposed when door 29 is opened. Caps/covers 53 provide a finished appearance when door 29 is opened. The sizes, shapes, and angular orientations of the flanges, openings, and other features of brackets 47 may be somewhat different than the corresponding features of bracket 46 as required to provide for connection to lower rails 20A and 20B. Trim piece 41 may be connected to trim pieces 42 and 43 utilizing threaded fasteners (not shown) or other suitable arrangement.

Figure 8:
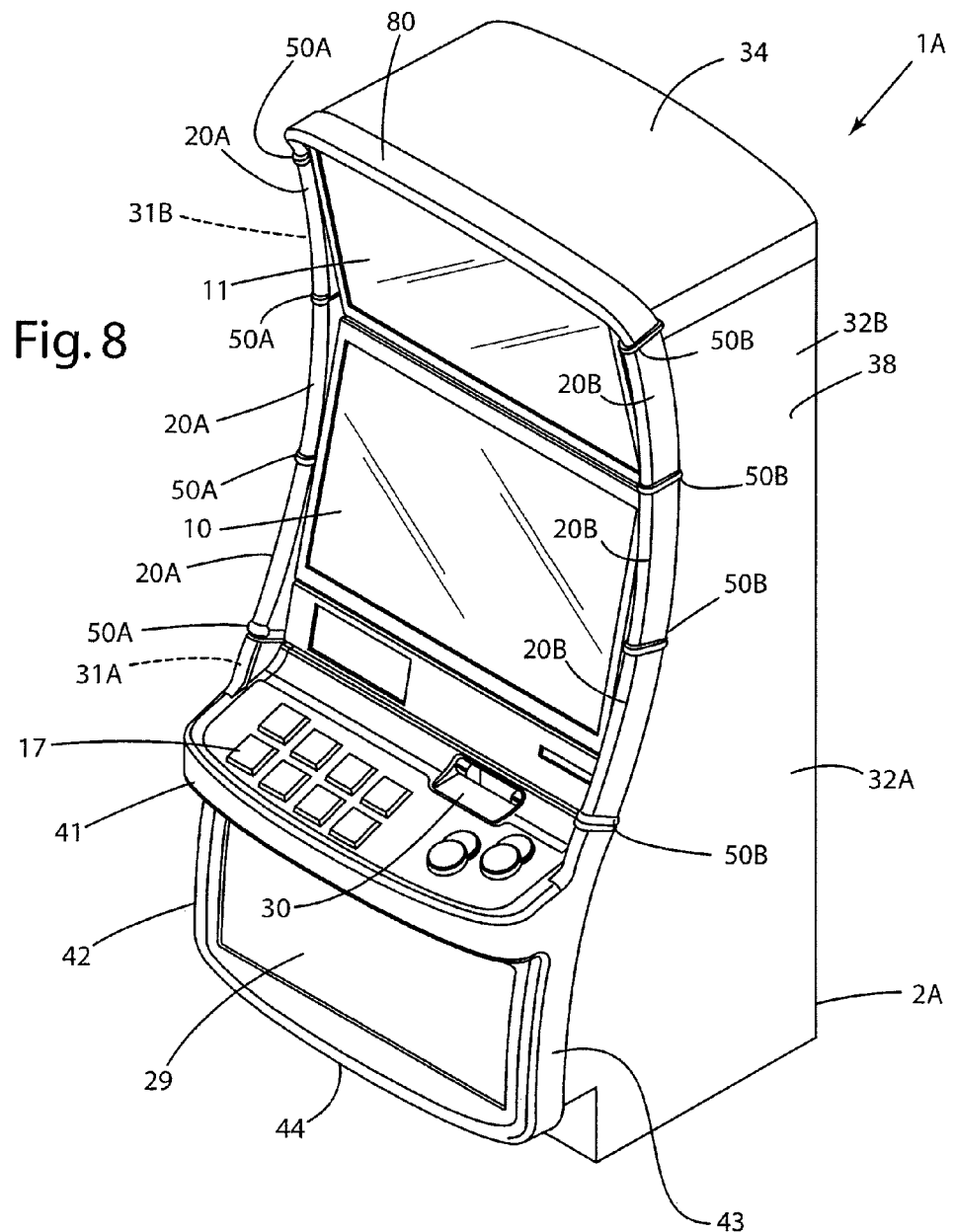
FIG. 8 is an isometric view of a gaming machine according to another aspect of the invention.

With further reference to FIG. 8, a gaming machine 1A according to another aspect of the present invention utilizes rails 20A and 20B, and lighting units 50A and 50B. The rail 20A and 20B, and lighting units 50A and 50B may be connected to the cabinet structure 2A utilizing brackets 45, 46, and 47 in substantially the same manner as described above for gaming machine 1. In the illustrated example, gaming machine 1A includes three rails 20A, and three rails 20B. Gaming machine 1A may utilize cabinet sections 31A, 32A, 31B, and 32B that are substantially the same as gaming machine 1. However, the upper side panel portions 31C and 32C are not included in the gaming machine 1A to thereby reduce height. Also, the number of rails 20A and 20B utilized in gaming machine 1A are also reduced to provide for a reduced height. In the illustrated example, gaming machine 1A includes first and second display screens 10 and 11. However, gaming machine 1A may utilize a single display screen if required for a particular application. In the illustrated example, gaming machine 1A includes an upper horizontal member 80 that is substantially the same as the horizontal member 80 (FIG. 2) of gaming machine 1. However, the configuration of upper horizontal member 80 may be modified if required to provide the desired appearance for gaming machine 1A.

Figure 9:
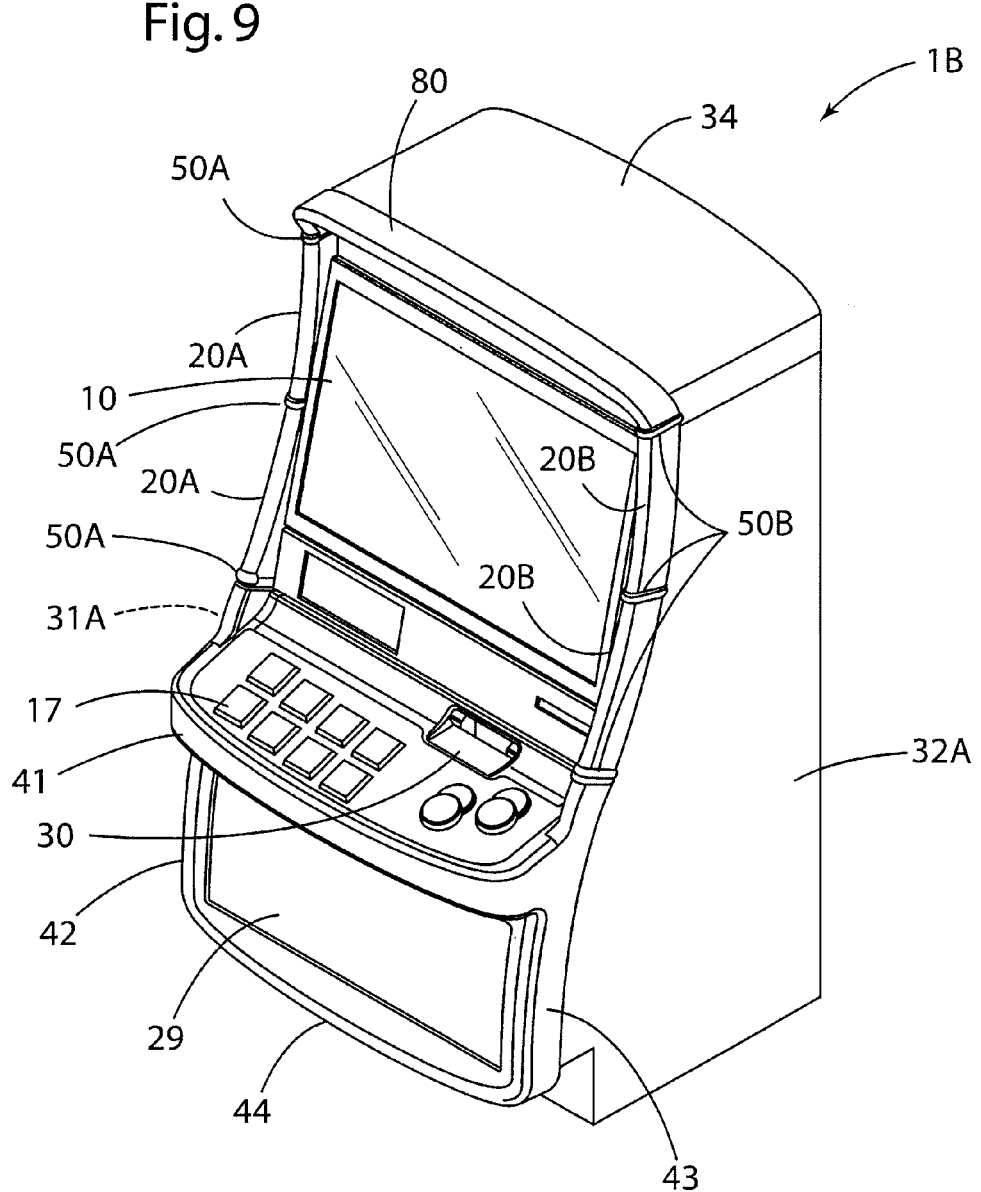
FIG. 9 is an isometric view of a gaming machine according to yet another aspect of the present invention.

Thus, the number of rails 20A and 20B required for a gaming 1, 1A, 1B, etc. can be adjusted as required to provide for a gaming machine having the desired height. In this way, the need to fabricate trim/rails that are specifically configured for a given height gaming machine is eliminated. Also, the number of light units 50A and 50B may also be adjusted as required to correspond to the number of rails 20A and 20B that are utilized in a specific gaming machine. Also, if a gaming machine having a height that falls between one of the heights that can be provided utilizing standard length rails 20A and 20B, the length of rails 20A and 20B may be modified as required. For example, if a cabinet having a height that is between gaming machines 1A and 1B is required, a pair of rails 20A and 20B may be utilized in substantially the same manner as illustrated in FIG. 9. In addition, an additional rail 20A and 20B may be cut to a reduced length (not shown), and utilized in place of the upper most rails 20A and 20B shown in FIG. 8.

With further reference to FIG. 8, a gaming machine 1B according to another aspect of the present invention has an overall height that is reduced relative to the gaming machine 1A (FIG. 8). In the illustrated example, gaming machine 1B includes a single display screen 10, and two rails 20A, and two rails 20B.

Figure 10:
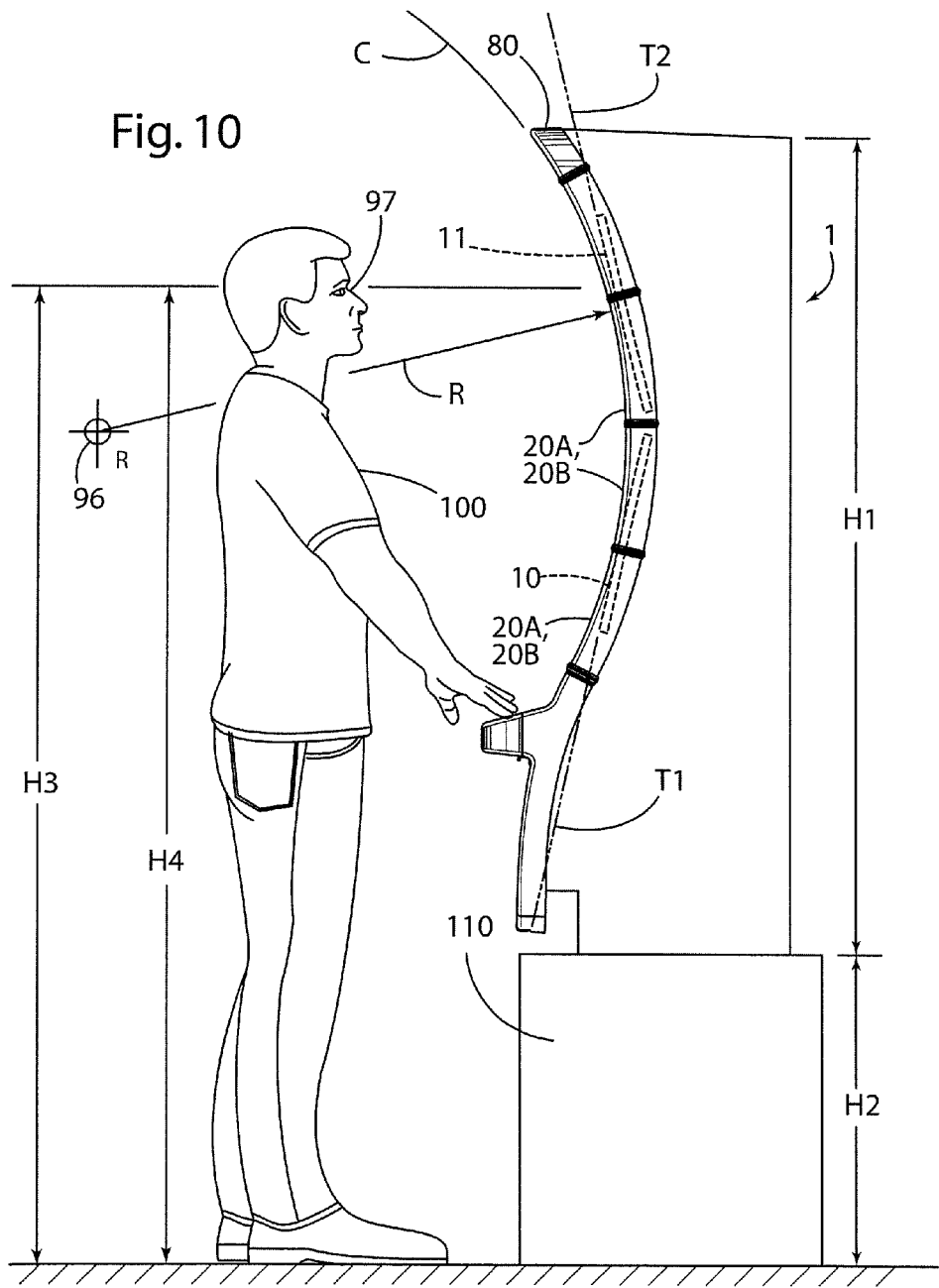
FIG. 10 is a side elevational view of the gaming machine of FIG. 1.

With further reference to FIG. 10, rails 20A and 20B have an arcuate shape in plan view with a constant radius "R" about a center point 96. Gaming machine 1 may be mounted on a base 110. In the illustrated example, the gaming machine 1 has an overall height "H1" of about 55 inches, and the base 110 has a height "H2" of about 21 inches. This results in center point 96 being positioned at a height "H3" of about 58 inches. Eyes 97 of a user 100 are located at a height "H4". Depending on how tall the user is, the center point 96 will generally be at approximately the same height as the user's eyes 97, or somewhat less. In the illustrated example, the height "H4" is 66 inches, such that the center point 96 is about 8 inches below the height "H4" of the user's eyes 97.

Referring again to FIG. 10, the radius "R" defines a circle "C". Lower display screen 10 may be mounted such that its front face is parallel to a tangent line "T1" intersecting circle "C", and upper display screen 11 may be mounted such that its front face is parallel to a tangent line "T2" of circle "C". Thus, lower display screen 10 is mounted such that it faces upwardly somewhat towards the user's eyes 97, and upper display screen 11 is angled downwardly somewhat towards the user's eyes 97. As discussed above, shorter gaming machines (e.g. gaming machine 1B; FIG. 9) may include a single display screen 10. The curvature of rails 20 permits the rails 20 to be positioned on gaming machines of various heights, and one or more display screens 10, 11 may be positioned such that they extend between the rails 20 and face upwardly or downwardly towards the user's eyes 97. Thus, the rail segments 20 can be utilized in a variety of gaming machines having different heights, and one or more video display screens or other video or optical type devices can be mounted in an orientation wherein they are readably visible to a user 100.

Figure 11:
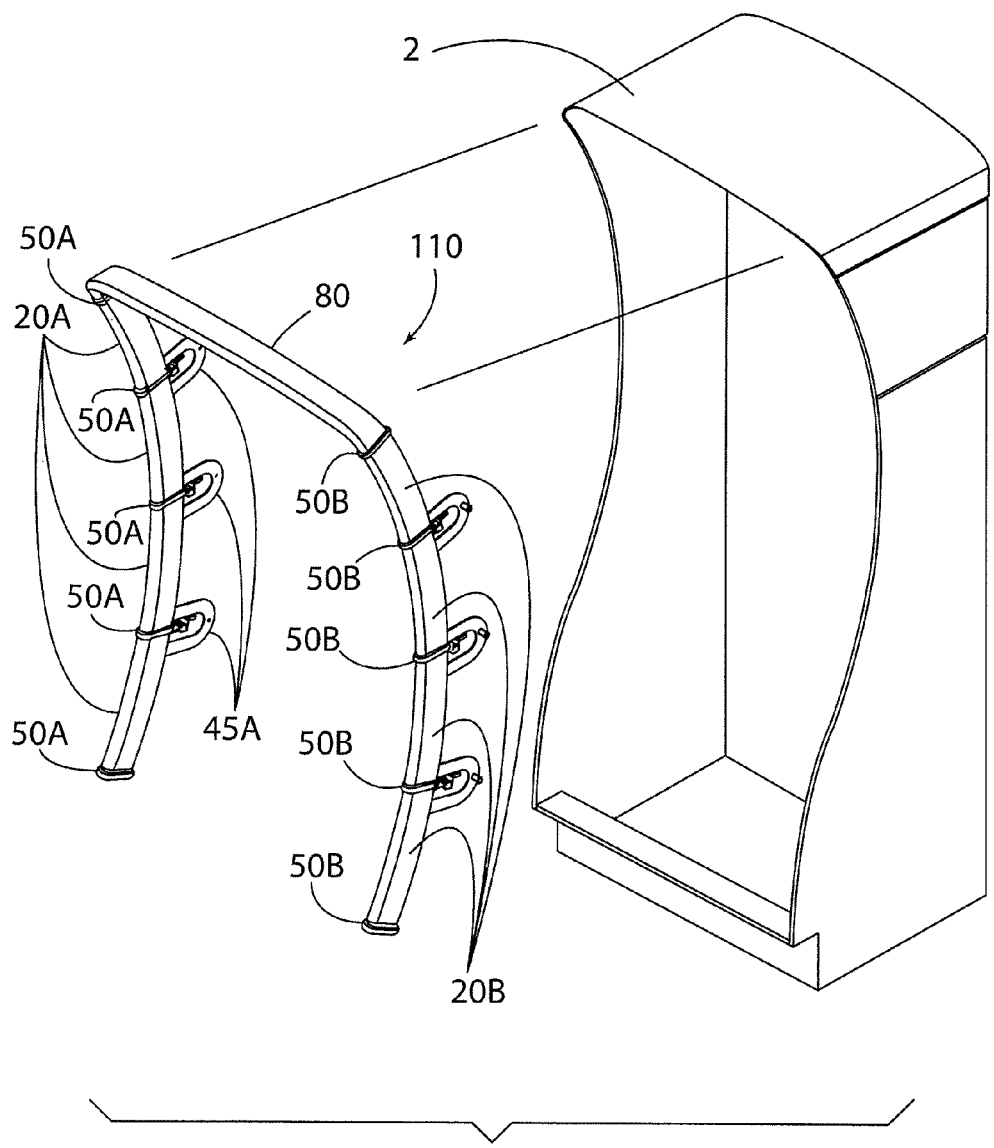
FIG. 11 is an isometric view of the gaming machine of FIG. 2 during assembly.

With further reference to FIG. 11, during assembly the required number of vertical side rails 20A and 20B are interconnected utilizing U-brackets 45A and 45B, respectively, and lighting units 50A and 50B are also assembled with the rails 20A and 20B utilizing U-brackets 45A and 45B. The upper horizontal cross member 80 is interconnected with the uppermost rails 20A and 20B utilizing brackets 46A and 46B, with light units 50A and 50B positioned between the ends 81 and 82 of upper horizontal cross member 80 and the uppermost vertical side rail 20A and 20B, respectively. The lower brackets 47A and 47B, and lower most lighting units 50A and 50B, along with caps or covers 53, are interconnected with the lowermost vertical side rails 20A and 20B. This forms an assembly 110 that is then connected to the cabinet structure 2 as a unit. Although other assembly procedures may be utilized, it is presently referred that all of the rails 20, upper cross-member 80, lighting units 50, and brackets 45, 46, 47 are interconnected to form assembly 110 prior to connection of the assembly 110 to the cabinet structure 2.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:
1. A gaming machine comprising:
   a cabinet structure including front and rear sides and generally upright opposite side faces extending between the front and rear sides and intersecting the front side to define first and second horizontally spaced-apart vertically-extending forward corner portions;
at least one display screen disposed on the front side of the cabinet structure;
at least one controller operably connected to the display screen and causing the display screen to display game images;
at least one user input feature operably connected to the controller to provide for user interaction with the gaming machine;
at least two generally upright elongated side rails connected to the cabinet structure and extending along the first forward corner portion, and at least two generally upright elongated side rails connected to the cabinet structure and extending along the second forward corner portion, wherein each elongated side rail defines a length and an outer surface, and wherein the lengths and the outer surfaces of the elongated side rails extending along the first forward corner position are substantially identical to one another, and the lengths and outer surfaces of the elongated side rails extending along the second forward corner portion are substantially identical to one another, and wherein the at least two elongated rails extending along the first corner portion are disposed in an end-to-end manner, and the at least two elongated rails extending along the second corner portion are disposed in an end-to-end manner; and including:
a first lighted spacer positioned between the two elongated rails disposed along the first corner portion, and a second lighted spacer positioned between the two elongated rails disposed along the second corner portion.

2. The gaming machine of claim 1, wherein:
the lighted spacers define outer surfaces, and wherein the outer surfaces of the lighted spacers protrude outwardly from the outer surfaces of the elongated side rails.

3. The gaming machine of claim 1, wherein:
the elongated rails disposed along the first corner portion define ends that are spaced apart to form a first gap, and the first lighted spacer is disposed in the first gap;
the elongated rails disposed along the second corner portion define ends that are spaced apart to form a second gap, and the second spacer is disposed in the second gap.

4. The gaming machine of claim 3, wherein:
the first and second lighted spacers engage the ends of the elongated rails.

5. The gaming machine of claim 1, wherein:
the outer surfaces of the elongated side rails include forwardly-facing curved portions that are concave in a side elevational view of the gaming machine.

6. The gaming machine of claim 5, wherein:
the forwardly-facing curved portions define a constant radius whereby the curved portions form segments of a circle.

7. The gaming machine of claim 6, wherein:
each elongated side rail defines a curved axis extending along the length of the side rail, and wherein the outer surfaces of the elongated side rails have a cross shape in cross section that is substantially uniform along the curved axis.

8. The gaming machine of claim 1, wherein:
the gaming machine includes at least four substantially identical elongated side rails extending along the first forward corner portion in an end-to-end manner, and at least four substantially identical elongated side rails extending along the second forward corner portion in an end-to-end manner.

9. The gaming machine of claim 1, wherein:
the gaming machine includes at least four substantially identical elongated side rails extending along the first forward corner portion in an end-to-end manner, and at least four substantially identical elongated side rails extending along the second forward corner portion in an end-to-end manner;
the outer surface of each side rail includes a forwardly-facing portion that is shaped such that it forms a concave segment of a circle in a side elevational view of the gaming machine;
the forwardly-facing portion of the outer surface of at least one elongated rail extending along the first corner portion faces at least partially upwardly;
the forwardly-facing portion of the outer surface of at least one elongated rail extending along the second corner portion faces at least partially upwardly;
the forwardly-facing portion of the outer surface of at least one elongated rail extending along the first corner portion faces at least partially downwardly; and
the forwardly-facing portion of the outer surface of at least one elongated rail extending along the second corner portion faces at least partially downwardly.

10. A gaming machine comprising:
a cabinet structure including front and rear sides and generally upright opposite side faces extending between the front and rear sides and intersecting the front side to define first and second horizontally spaced-apart vertically-extending forward corner portions;
at least one display screen disposed on the front side of the cabinet structure;
at least one controller operably connected to the display screen and causing the display screen to display game images;
at least one user input feature operably connected to the controller to provide for user interaction with the gaming machine;
at least two generally upright elongated side rails connected to the cabinet structure and extending along the first forward corner portion, and at least two generally upright elongated side rails connected to the cabinet structure and extending along the second forward corner portion, wherein each elongated side rail defines a length and an outer surface, and wherein the lengths and the outer surfaces of the elongated side rails extending along the first forward corner position are substantially identical to one another, and the lengths and outer surfaces of the elongated side rails extending along the second forward corner portion are substantially identical to one another;
a first bracket connected to the cabinet structure and to the two elongated side rails extending along the first forward corner portion;
a second bracket connected to the cabinet structure and to the two elongated side rails extending along the second forward corner portion; and
the first bracket defines a central portion that is rigidly connected to the cabinet structure and first and second opposite ends that are connected to a first and a second one of the two elongated side rails extending along the first forward corner portion.

11. A gaming machine comprising:
a cabinet structure including front and rear sides and generally upright opposite side faces extending between the front and rear sides and intersecting the front side to define first and second horizontally spaced-apart vertically-extending forward corner portions;

at least one display screen disposed on the front side of the cabinet structure;

at least one controller operably connected to the display screen and causing the display screen to display game images;

at least one user input feature operably connected to the controller to provide for user interaction with the gaming machine;

at least two generally upright elongated side rails connected to the cabinet structure and extending along the first forward corner portion, and at least two generally upright elongated side rails connected to the cabinet structure and extending along the second forward corner portion, wherein each elongated side rail defines a length and an outer surface, and wherein the lengths and the outer surfaces of the elongated side rails extending along the first forward corner position are substantially identical to one another, and the lengths and outer surfaces of the elongated side rails extending along the second forward corner portion are substantially identical to one another;

the gaming machine includes at least four substantially identical elongated side rails extending along the first forward corner portion in an end-to-end manner, and at least four substantially identical elongated side rails extending along the second forward corner portion in an end-to-end manner; and adjacent side rails have ends that are spaced apart from one another to form gaps, and including:

lighted spacers disposed in the gaps.

12. The gaming machine of claim 11, wherein:
the side rails comprise metal, and each lighted spacer includes a body made of a light-transmitting polymer material and a light source connected to the body and providing light that is transmitted through at least a portion of the light-transmitting polymer material.

13. A gaming machine cabinet comprising:
a cabinet structure defining front and rear sides, and opposite sides extending between the front and rear sides to define at least two vertically extending corner portions;
a plurality of elongated rails extending along at least one of the corner portions in an end-to-end manner, wherein the elongated rails are substantially identical to one another in appearance; and
at least one light member disposed between ends of adjacent elongated rails, the light members having lighted outer forward surfaces facing forwardly from the front side of the cabinet structure, the light members further including outer side surfaces facing outwardly from the opposite sides of the cabinet structure.

14. The gaming machine cabinet of claim 13, wherein:
each rail defines opposite ends, and wherein ends of adjacent elongated rails are spaced-apart to form a gap.

15. The gaming machine cabinet of claim 13, including:
a substantially rigid bracket connected to at least two elongated rails and to the cabinet structure.

16. The gaming machine cabinet of claim 13, wherein:
the elongated rails include forwardly-facing concave surfaces.

* * * * *